United States Patent
Tang

(10) Patent No.: US 7,436,604 B1
(45) Date of Patent: Oct. 14, 2008

(54) OPTICAL LENS SYSTEM FOR TAKING IMAGE

(75) Inventor: Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/923,604

(22) Filed: Oct. 24, 2007

(30) Foreign Application Priority Data

May 7, 2007 (TW) .............................. 96116152 A

(51) Int. Cl.
*G02B 13/18* (2006.01)
*G02B 9/04* (2006.01)
(52) U.S. Cl. ...................................... 359/717; 359/795
(58) Field of Classification Search ................. 359/716, 359/717, 795
See application file for complete search history.

(56) References Cited

U.S. PATENT DOCUMENTS

2008/0062536 A1* 3/2008 Chen et al. ................. 359/717

* cited by examiner

*Primary Examiner*—Scott J Sugarman
(74) *Attorney, Agent, or Firm*—Banger Shia

(57) ABSTRACT

An optical lens system for taking image comprises two lens elements with refractive power, from the object side to the image side: a first lens element with positive refractive power having a convex object-side surface and a concave image-side surface, the object-side surface and the image-side surface of the first lens element being aspheric; a second lens element with negative refractive power having a concave object-side surface and a concave image-side surface, the object-side surface and the image-side surface of the second lens element being aspheric, the image-side surface of the second lens element being formed with an inflection point; and an aperture stop located in front of the first lens element. A focal length of the second lens element is f2, a focal length of the optical lens system is f, and they satisfy the relation: $-0.55 < f/f2 < -0.05$ and $f/EPD < 3.6$.

18 Claims, 6 Drawing Sheets

OPTICAL LENS SYSTEM FOR TAKING IMAGE

BACKGROUND OF THE INVENTION

1. Field of the Invention

The present invention relates to an optical lens system for taking image, and more particularly to an optical lens system for taking image used in a mobile phone camera.

2. Description of the Prior Art

In recent years, with the popularity of camera mobile phone, the optical lens system for taking image has become thinner and thinner, and the sensor of a general digital camera is none other than CCD (Charge Coupled Device) or CMOS (Complementary Metal Oxide Semiconductor). Due to advancement in semiconductor manufacturing, the pixel size of sensors has been reduced from 7.4 um of the early stage to the current 1.75 um. Therefore, there's increasing demand for thinner optical lenses.

In consideration of aberration correction, a conventional mobile phone's lens assembly usually consists of three lens elements, one of the typical structures is the Triplet type. However, when the length of the lens assembly is reduced from 5 mm to less than 3 mm, less space is available for the optical system, making it difficult to insert the three lens elements into the space of the optical system. Therefore, the lens elements must become thinner, causing poor uniformity if the lens is made from plastic injection molding.

The present invention mitigates and/or obviates the afore-described disadvantages.

SUMMARY OF THE INVENTION

To solve the problem of the optical system for taking image, the present invention provides an optical system for taking image, which consists of two lens elements with refractive power and an aperture stop An optical system for taking image in accordance with the present invention comprises two lens elements with refractive power, from the object side to the image side:

a first lens element with positive refractive power having a convex object-side surface and a concave image-side surface, the object-side surface and the image-side surface of the first lens element being aspheric;

a second lens element with negative refractive power having a concave object-side surface and a concave image-side surface, the object-side surface and the image-side surface of the second lens element being aspheric, the image-side surface of the second lens element being formed with an inflection point; and an aperture stop located in front of the first lens element.

In the present optical lens system for taking image, the refractive power of the optical lens system for taking image of the present invention is mainly provided by the first lens element with positive refractive power, the second lens element with negative refractive power serves to balance and correct the various aberrations caused by the system.

In the present optical lens system for taking image, the object-side surface and the image-side surface of the first lens element with positive refractive power are convex and concave, respectively. The object-side surface and the image-side surface of the second lens element with negative refractive power are both concave. By such arrangements, the image quality can be improved effectively.

The first lens element provides a strong positive refractive power, and the aperture stop is located in front of the first lens element, so that the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of shading. And inflection points are formed on the second lens element to contribute to a better correction of the incident angle of the off axis light with respect to the sensor.

In the present optical lens system for taking image, plastic or glass material is introduced to make lens elements. The surface of lens element is aspheric, allowing more design parameters (than spherical surfaces), so as to better reduce the aberration and the number of the lens elements, so that the length of the optical lens system can be reduced effectively.

In the present optical lens system for taking image, the focal length of the first lens element is f1, the focal length of the optical lens system is f, and they satisfy the relation:

$$0.8 < f/f1 < 1.5.$$

If the value of f/f1 is smaller than the above lower limit, the refractive power of the optical lens system for taking image will be weak, the length of the optical lens system will be too long, and it will be difficult to suppress the incident angle of the light with respect to the sensor. And if the value of f/f1 is greater than the above upper limit, it will lead to large high order aberrations. Further, it will be better if f/f1 satisfies the relation:

$$1.0 < f/f1 < 1.2.$$

In the present optical lens system for taking image, the focal length of the second lens element is f2, the focal length of the optical lens system is f, and they satisfy the relation:

$$-0.55 < f/f1 < -0.05.$$

If the value of f/f2 is smaller than the above low limit, the total optical length of the optical lens system for taking image will be too long, and this will be counter to the objective of miniaturization of the optical lens system for taking image. If the value of f/f2 is greater than the above upper limit, it will be difficult to correct the chromatic aberration caused by the optical lens system. Further, it will be better if f/f2 satisfies the relation:

$$-0.35 < f/f2 < -0.05.$$

And it will be much better if f/f1 satisfies the relation:

$$-0.3 < f/f2 < -0.2.$$

In the present optical lens system for taking image, the focal length of the optical lens system is f, the Entrance Pupil diameter is EPD, and they satisfy the relation:

$$f/EPD < 3.6.$$

The above relation can effectively improve the brightness of the optical lens system for taking image while shortening the image exposure time.

In the present optical lens system for taking image, the radius of curvature of the object-side surface of the first lens element is R1, the radius of curvature of the image-side surface of the first lens element is R2, and they satisfy the relation:

$$0.4 < R1/R2 < 0.7.$$

If the value of R1/R2 is lower than the lower limit stated above, it will be difficult to correct the astigmatism caused by the optical lens system for taking image. On the other hand, if the value of R1/R2 is higher than the above upper limit, it will be difficult to correct the spherical aberration caused by the optical lens system.

In the present optical lens system for taking image, the radius of curvature of the object-side surface of the second lens element is R3, the radius of curvature of the image-side surface of the second lens element is R4, and they satisfy the relation:

$$-2.5 < R3/R4 < -0.1.$$

If the value of R3/R4 is lower than the lower limit as stated above, the absolute value of R3 will be relatively large, and it will be difficult to correct the chromatic aberration caused by the optical lens system. On the other hand, if the value of R3/R4 is higher than the above upper limit, the absolute value of R3 will be relatively small, and the length of the optical lens system for taking image will be too long. And it will better if the value of R3/R4 satisfies the relation:

$$-0.5 < R3/R4 < -0.1.$$

In the present optical lens system for taking image, the refractive index of the first lens element is N1, and it satisfies the relation:

$$1.53 < N1 < 1.56.$$

The above-relation enables the optical lens system for taking image to obtain better image quality.

In the present optical lens system for taking image, the Abbe number of the first lens element is V1, the Abbe number of the second lens element is V2, and they satisfy the relation:

$$|V1-V2| < 10.$$

The above relation can effectively correct the aberration and Coma caused by the optical system and improve the resolution of the optical lens system for taking image. And the chromatic aberration can be more effectively corrected if the Abbe number V2 of the second lens element satisfies the relation:

$$V2 < 32.$$

In the present optical lens system for taking image, the center thickness of the second lens element is CT2, and it satisfies the relation:

$$CT2 < 1.8 \text{ mm}.$$

The above relation can effectively reduce the total optical length of the optical lens system.

In the present optical lens system for taking image, the on-axis spacing of the first lens element and the second lens element is T12, the focal length of the optical lens system is f and they satisfy the relation:

$$0.2 < T12/f < 0.32.$$

The above relation effectively corrects the high order aberrations of the system and contributes to the miniaturization of the optical lens system for taking image.

In the present optical lens system for taking image, the tangential angle at the position of the effective optical diameter of the image-side surface of the second lens element is ANG22, and it satisfies the relation:

$$ANG22 < -50 \text{ deg}.$$

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and planes Plane Tan and Plane Norm, respectively. This tangential angle is less than 90 degree in absolute value. The sign of the tangential angle is taken to be negative if N is closer than T to the object side of the optical lens system, and positive otherwise.

The above relation can effectively reduce the incident angle of the light with respect to the sensor while improving the correction of the off axis aberration.

In the present optical lens system for taking image, an object to be photographed is imaged on an electronic sensor, a total optical length of the optical lens system is TL, an image height of the optical lens system is ImgH, and they satisfy the relation:

$$TL/ImgH < 1.9.$$

The above relation contributes to the miniaturization of the optical lens system for taking image.

DETAILED DESCRIPTION OF THE PREFERRED EMBODIMENTS

Figure 1:
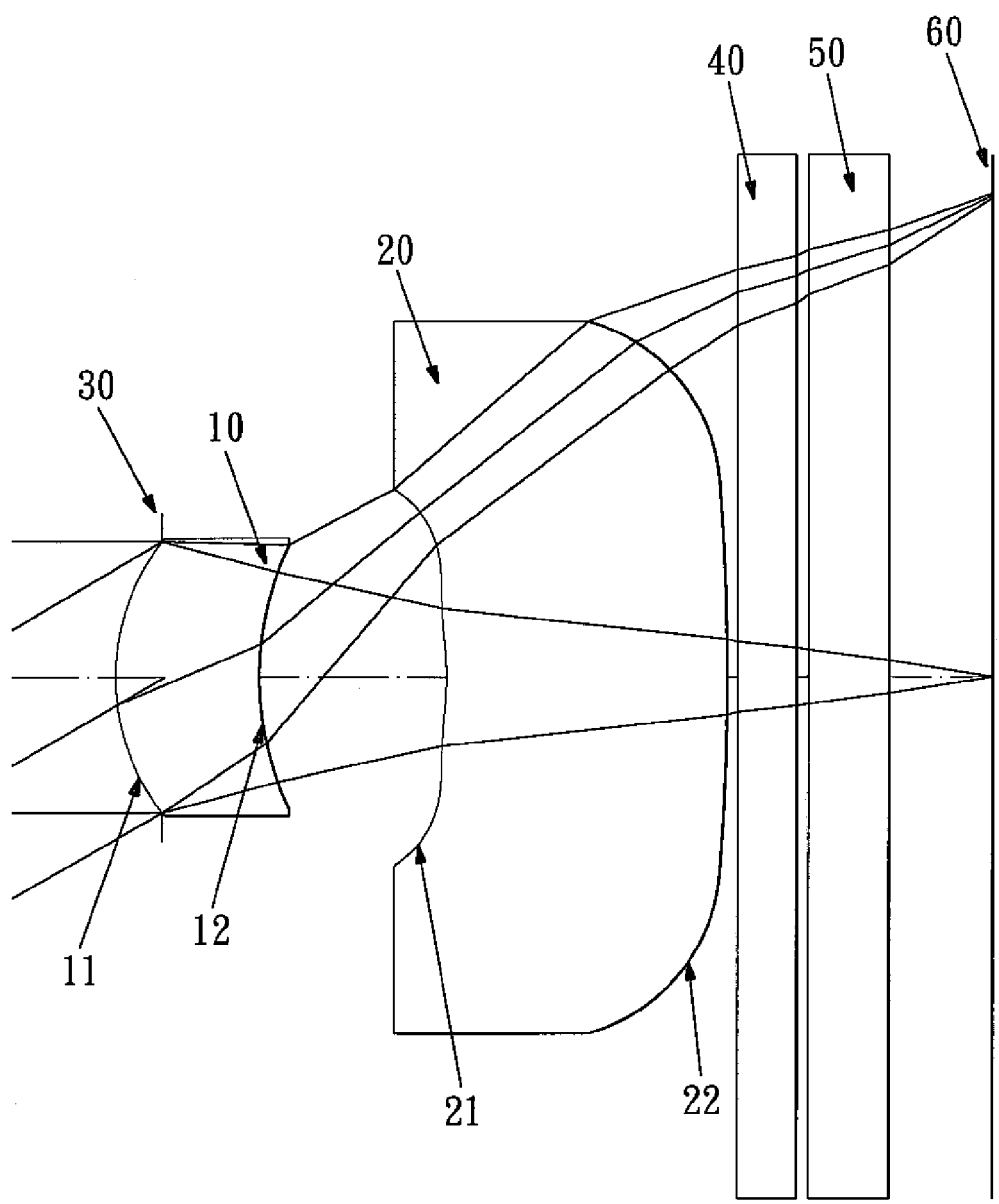
FIG. 1 shows an optical lens system for taking image in accordance with a first embodiment of the present invention.
Figure 2:
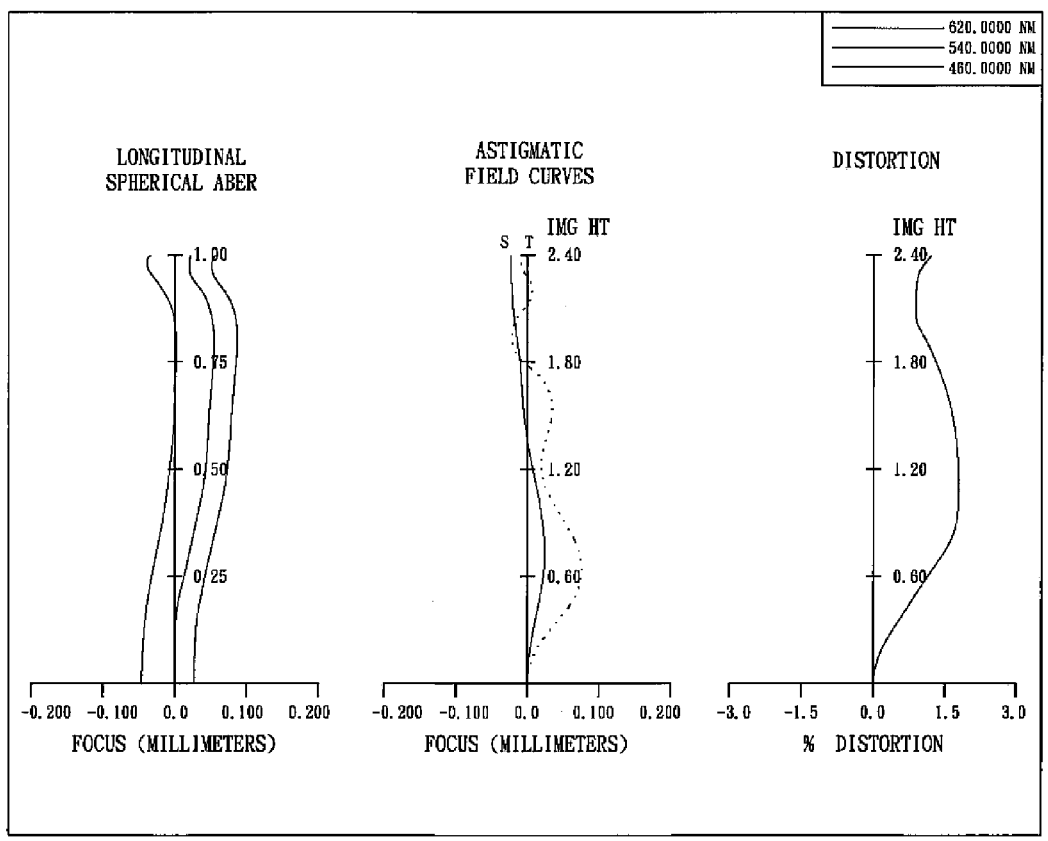
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. The first embodiment of the present invention is an optical lens system for taking image comprising two lens elements with refractive power, and the optical lens system for taking image comprises: from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a concave image-side surface 22, the object-side surface 21 and the image-side surface 22 of the second lens element 20 are aspheric, and an inflection point is formed on the image-side surface 22.

An aperture stop 30 is located in front of the first lens element 10.

An IR cut filter 40 is located behind the second lens element 20 and has no influence on the focal length of the optical lens system.

A sensor cover glass 50 is located behind the IR cut filter 40 and has no influence on the focal length of the optical lens system.

An image plane 60 is located behind the sensor cover glass 50.

The equation of the curve of the aspheric surfaces is expressed as follows:

$$X(Y) = (Y^2/R)/(1 + sqrt(1 - (1+k)*(Y/R)^2)) = \sum_{i=1}^{20} (Ai)*(Y^i)$$

wherein:

X: the depth from a point on the aspheric lens surface at a distance Y from the optical axis to the tangential plane of the aspheric surface vertex;

Y: the distance from the point on the curve of the aspheric surface to the optical axis;

k: the conic coefficient;

Ai: the ith aspheric coefficient.

In the first embodiment of the present optical lens system for taking image, the focal length of the first lens element is f1, the focal length of the second lens element is f2, the focal length of the optical lens system for taking image is f, the Entrance Pupil Diameter is EPD, and they satisfy the relations:

$f/f1=1.11$ $f/f2=-0.24$ $f/EPD=2.85$.

In the first embodiment of the present optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, and they satisfy the relations:

$R1/R2=0.52$ $R3/R4=-0.24$

In the first embodiment of the present optical lens system for taking image, the refractive index of the first lens element is N1, and it satisfies the relation:

$N1=1.543$

In the first embodiment of the present optical lens system for taking image, the Abbe number of the first lens element is V1, the Abbe number of the second lens element is V2, and they satisfy the relations:

$|V1-V2|=0$ $V2=60.3$.

In the first embodiment of the present optical lens system for taking image, the center thickness of the second lens element is CT2, the on-axis spacing of the first lens element and the second lens element is T12, the focal length of the present optical lens system for taking image is f, and they satisfy the relations:

$CT2=1.385$ mm $T12/f=0.24$.

In the first embodiment of the present optical lens system for taking image, the tangential angle at the position of the effective optical diameter of the image-side surface of the second lens element is ANG22, and $ANG22=-70.4$ deg.

In the first embodiment of the present optical lens system for taking image, the total optical length of the optical lens system is TL, the image height of the optical lens system is Imgh, and they satisfy the relation:

$TL/ImgH=1.81$.

The detailed optical data of the first emobdiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f (focal length) = 3.86 mm, Fno = 2.85, HFOV (half of field of view) = 31.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.226 | | | | |
| 2 | Lens 1 | 1.11210 (ASP) | 0.710 | Plastic | 1.543 | 60.3 | 3.43 |
| 3 | | 2.12256 (ASP) | 0.933 | | | | |
| 4 | Lens 2 | −10.82790 (ASP) | 1.385 | Plastic | 1.543 | 60.3 | −15.82 |
| 5 | | 44.59360 (ASP) | 0.050 | | | | |
| 6 | IR-filter | Plano | 0.300 | Glass | 1.517 | 64.2 | — |
| 7 | | Plano | 0.050 | | | | |
| 8 | Cover Glass | Plano | 0.400 | Glass | 1.517 | 64.2 | — |
| 9 | | Plano | 0.510 | | | | |
| 10 | Image | Plano | | | | | |

TABLE 2

Aspheric Coefficients

| | Surface # | | | |
|---|---|---|---|---|
| | 2 | 3 | 4 | 5 |
| K = | −1.36718E+00 | −6.99066E+01 | −5.00000E+02 | −5.0000E+02 |
| A4 = | 1.04918E−01 | 9.41306E−01 | −2.95749E−01 | −1.95757E−02 |
| A6 = | 4.44923E−01 | −3.48748E+00 | 5.90644E−01 | −6.37467E−02 |
| A8 = | −1.60125E+00 | 1.22405E+01 | −1.59437E+00 | 6.32249E−02 |
| A10 = | 3.24544E+00 | −2.27679E+01 | 2.06288E+00 | −3.48353E−02- |
| A12 = | −2.27282E+00 | 1.88741E+01 | −1.14883E+00 | 9.63428E−03 |
| A14 = | — | — | — | −1.09796E−03 |

Figure 3:
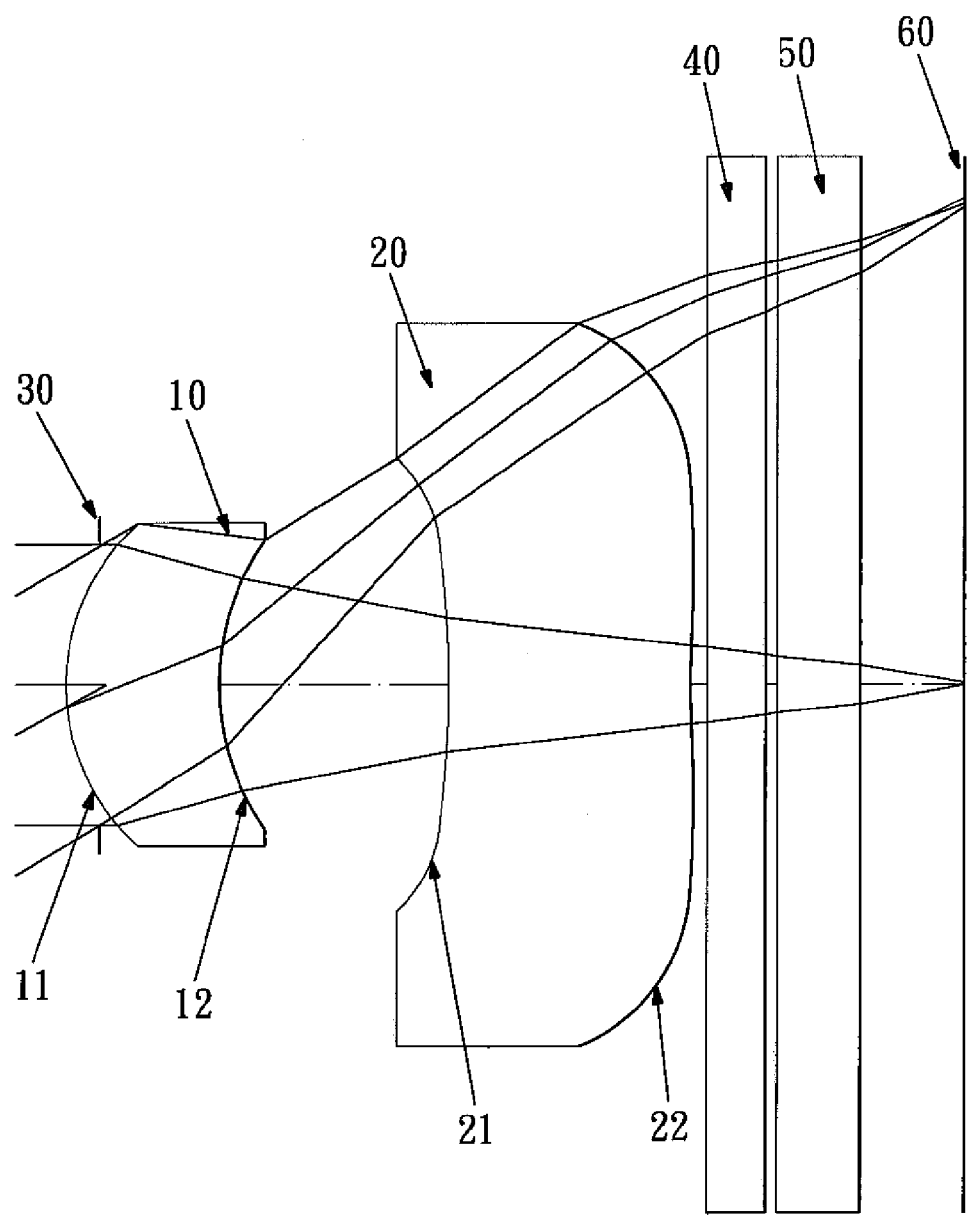
FIG. 3 shows an optical lens system for taking image in accordance with a second embodiment of the present invention.
Figure 4:
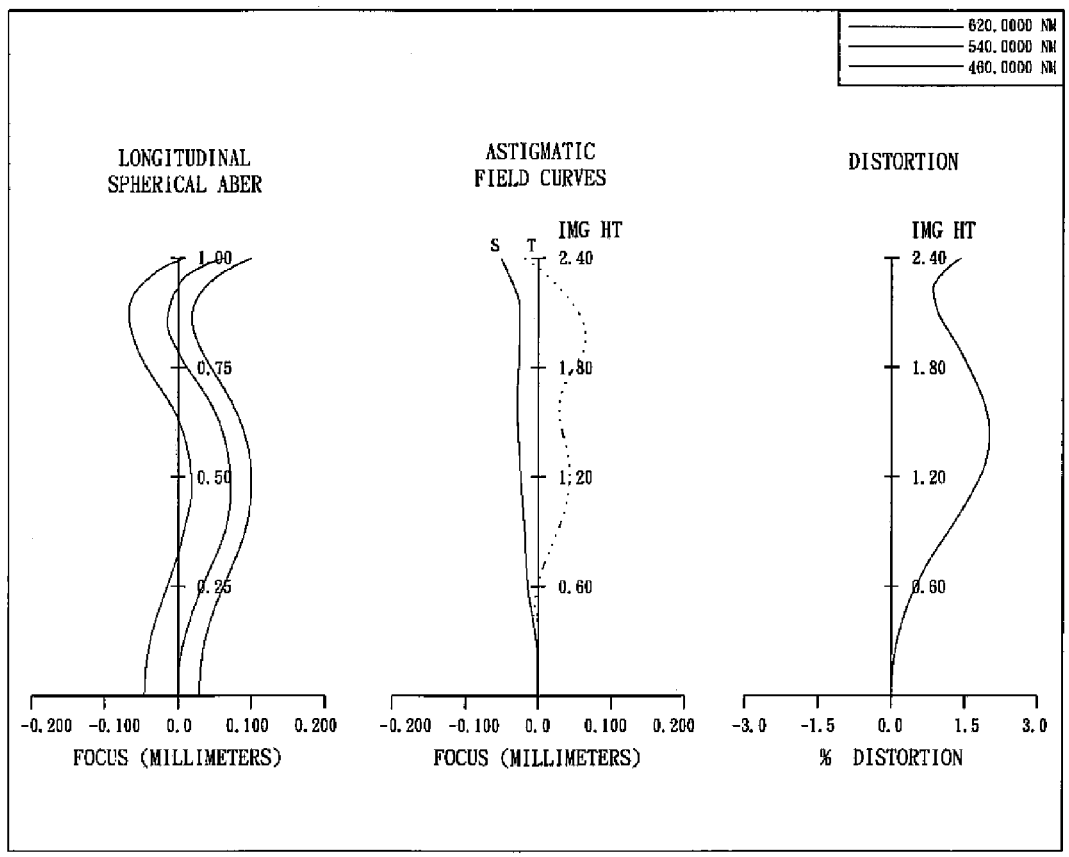
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. The second embodiment of the present invention is an optical lens system for taking image comprising two lens elements with refractive power, and the optical lens system for taking image comprises: from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a concave image-side surface 22, the object-side surface 21 and the image-side surface 22 of the second lens element 20 are aspheric, and an inflection point is formed on the image-side surface 22.

An aperture stop 30 is located in front of the first lens element 10.

An IR cut filter 40 is located behind the second lens element 20 and has no influence on the focal length of the optical lens system.

A sensor cover glass 50 is located behind the IR cut filter 40 and has no influence on the focal length of the optical lens system.

An image plane 60 is located behind the sensor cover glass 50.

The equation of the curve of the aspheric surfaces of the second embodiment has the same form as that of the first embodiment.

In the second embodiment of the present optical lens system for taking image, the focal length of the first lens element is f1, the focal length of the second lens element is f2, the focal length of the optical lens system for taking image is f, the Entrance Pupil Diameter is EPD, and they satisfy the relations:

$f/f1=1.07$ $f/f2=-0.21$ $f/EPD=2.87$.

In the second embodiment of the present optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, and they satisfy the relations:

$R1/R2=0.59$ $R3/R4=-2.24$.

In the second embodiment of the present optical lens system for taking image, the refractive index of the first lens element is N1, and it satisfies the relation:

$N1=1.543$

In the second embodiment of the present optical lens system for taking image, the Abbe number of the first lens element is V1, the Abbe number of the second lens element is V2, and they satisfy the relations:

$|V1-V2|=0$ $V2=60.3$.

In the second embodiment of the present optical lens system for taking image, the center thickness of the second lens element is CT2, the on-axis spacing of the first lens element and the second lens element is T12, the focal length of the present optical lens system for taking image is f, and they satisfy the relations:

$CT2=1.188$ mm $T12/f=0.28$.

In the second embodiment of the present optical lens system for taking image, the tangential angle at the position of the effective optical diameter of a image-side surface of the second lens element is ANG22, and ANG22=−63.7 deg.

In the second embodiment of the present optical lens system for taking image, the total optical length of the optical lens system is TL, the image height of the optical lens system is ImgH, and they satisfy the relation:

TL/ImgH=1.82.

The detailed optical data of the second embodiment is shown in table 3, and the aspheric surface data is shown in table 4, wherein the units of the radius of curvature, the thickness and the focal length are expressed in mm, and HFOV is half of the maximal-field of view.

TABLE 3

(Embodiment 1)
f (focal length) = 3.99 mm, Fno = 2.87, HFOV (half of field of view) = 30.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.179 | | | | |
| 2 | Lens 1 | 1.11060 (ASP) | 0.744 | Plastic | 1.543 | 60.3 | 3.69 |
| 3 | | 1.88692 (ASP) | 1.108 | | | | |
| 4 | Lens 2 | −34.14910 (ASP) | 1.188 | Plastic | 1.543 | 60.3 | −19.14 |
| 5 | | 15.24060 (ASP) | 0.060 | | | | |
| 6 | IR-filter | Plano | 0.300 | Glass | 1.517 | 64.2 | — |
| 7 | | Plano | 0.050 | | | | |
| 8 | Cover Glass | Plano | 0.400 | Glass | 1.517 | 64.2 | — |
| 9 | | Plano | 0.510 | | | | |
| 10 | Image | Plano | | | | | |

TABLE 4

Aspheric Coefficients

| Surface # | 2 | 3 | 4 | 5 |
|---|---|---|---|---|
| K = | −1.67501E+00 | −3.34669E+00 | −1.01864E+01 | −4.79679E+02 |
| A4 = | 1.65813E−01 | 1.89668E−01 | −5.72036E−02 | −7.68478E−03 |
| A6 = | 9.70694RE−02 | −2.62688E−01 | −1.87056E−01 | −3.39468E−02 |
| A8 = | 1.61197E−02 | 6.11154E−01 | 3.29540E−01 | 1.38690E−02 |
| A10 = | −4.93012E−02 | 3.84387E−01 | −3.06196E−01 | −3.19405E−03 |
| A12 = | 2.68005E−02 | — | 9.30424E−02 | 1.73054E−04 |

Figure 5:
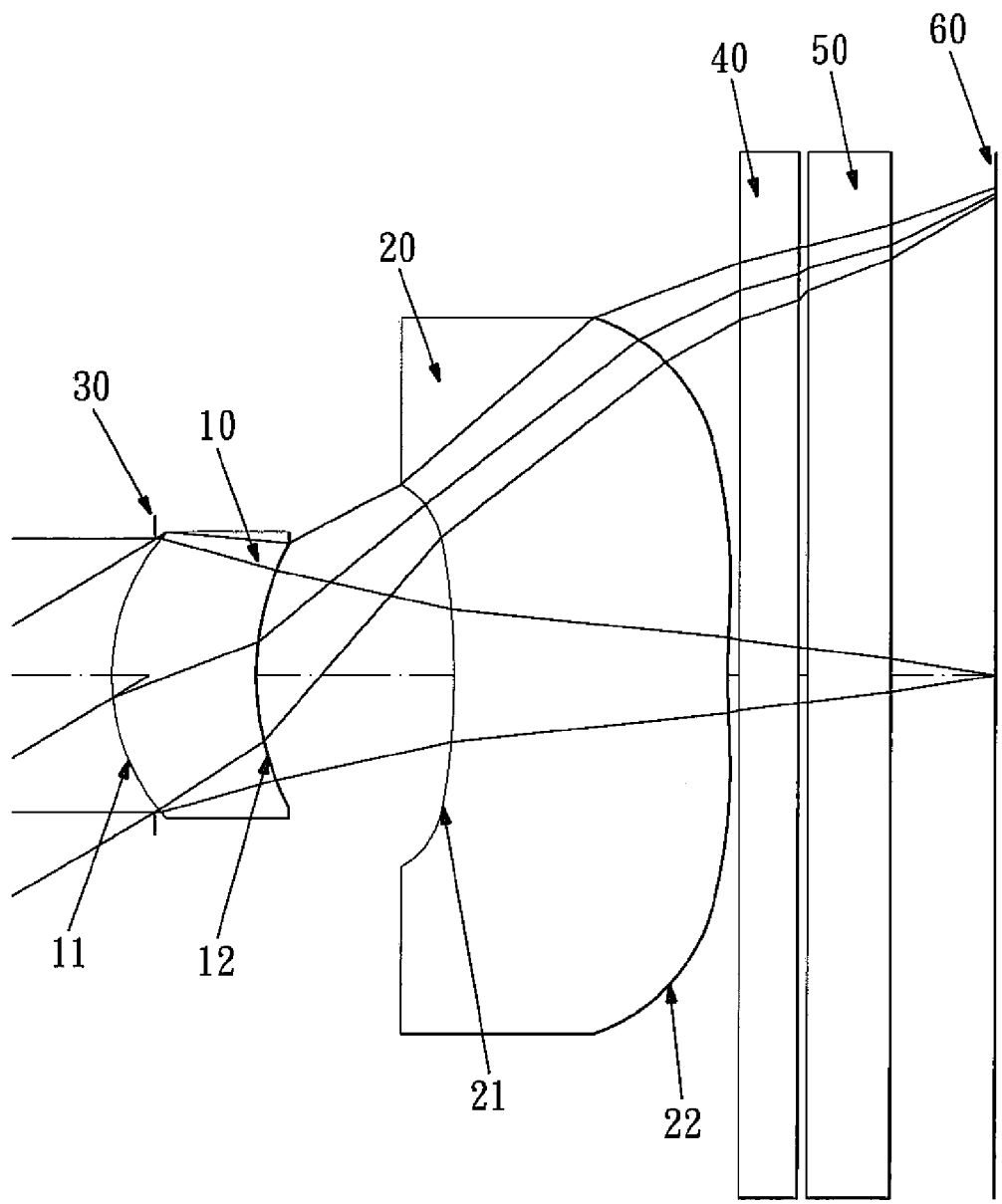
FIG. 5 shows an optical lens system for taking image in accordance with a third embodiment of the present invention.
Figure 6:
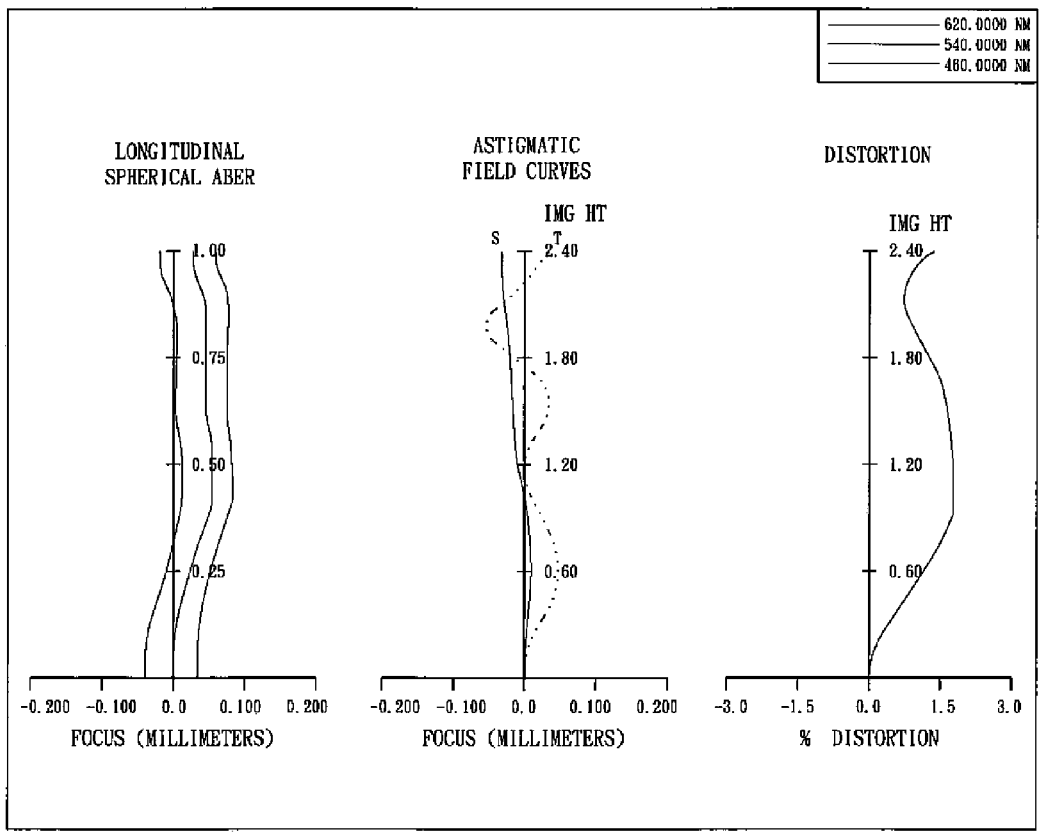
FIG. 6 shows the aberration curve of the third embodiment of the present invention.

Referring to FIG. 5, which shows an optical lens system for taking image in accordance with a third embodiment of the present invention, and FIG. 6 shows the aberration curve of the third embodiment of the present invention. The third embodiment of the present invention is an optical lens system for taking image comprising two lens elements with refractive power, and the optical lens system for taking image comprises: from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a concave image-side surface 22, the object-side surface 21 and the image-side surface 22 of the second lens element 20 are aspheric, and an inflection point is formed on the image-side surface 22.

An aperture stop 30 is located in front of the first lens element 10.

An IR cut filter 40 is located behind the second lens element 20 and has no influence on the focal length of the optical lens system.

A sensor cover glass 50 is located behind the IR cut filter 40 and has no influence on the focal length of the optical lens system.

An image plane 60 is located behind the sensor cover glass 50.

The equation of the curve of the aspheric surfaces of the third embodiment has the same form as that of the first embodiment.

In the third embodiment of the present optical lens system for taking image, the focal length of the first lens element is f1, the focal length of the second lens element is f2, the focal length of the optical lens system for taking image is f, the Entrance Pupil Diameter is EPD, and they satisfy the relations:

$f/f1=1.12$ $f/f2=-0.28$ $f/EPD=2.85.$

In the third embodiment of the present optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, and they satisfy the relations:

$R1/R2=0.51$ $R3/R4=-0.37.$

In the third embodiment of the present optical lens system for taking image, the refractive index of the first lens element is N1, and it satisfies the relation:

$N1=1.543$

In the third embodiment of the present optical lens system for taking image, the Abbe number of the first lens element is V1, the Abbe number of the second lens element is V2, and they satisfy the relations:

$|V1-V2|=30.1$ $V2=30.2.$

In the third embodiment of the present optical lens system for taking image, the center thickness of the second lens element is CT2, the on-axis spacing of the first lens element and the second lens element is T12, the focal length of the present optical lens system for taking image is f, and they satisfy the relations:

$CT2=1.348$ mm $T12/f=0.25.$

In the third embodiment of the present optical lens system for taking image, the tangential angle at the position of the effective optical diameter of a image-side surface of the second lens element is ANG22, and ANG22=−69.1 deg.

In the third embodiment of the present optical lens system for taking image, the total optical length of the optical lens system is TL, the image height of the optical lens system is ImgH, and they satisfy the relation:

$TL/ImgH=1.81.$

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 1)
f (focal length) = 3.86 mm, Fno = 2.85, HFOV (half of field of view) = 31.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.203 | | | | |
| 2 | Lens 1 | 1.11755 (ASP) | 0.705 | Plastic | 1.543 | 60.3 | 3.39 |
| 3 | | 2.18880 (ASP) | 0.968 | | | | |
| 4 | Lens 2 | −11.06030 (ASP) | 1.348 | Plastic | 1.583 | 30.2 | −13.59 |
| 5 | | 30.22120 (ASP) | 0.050 | | | | |
| 6 | IR-filter | Plano | 0.300 | Glass | 1.517 | 64.2 | — |

TABLE 5-continued (Embodiment 1)
f (focal length) = 3.86 mm, Fno = 2.85, HFOV (half of field of view) = 31.5 deg.

| Surface # | | Curvature Radius | Thickness | Material | Index | Abbe # | Focal length |
|---|---|---|---|---|---|---|---|
| 7 | | Plano | 0.050 | | | | |
| 8 | Cover Glass | Plano | 0.400 | Glass | 1.517 | 64.2 | — |
| 9 | | Plano | 0.510 | | | | |
| 10 | Image | Plano | | | | | |

TABLE 6

Aspheric Coefficients

| | Surface # | | | |
|---|---|---|---|---|
| | 2 | 3 | 4 | 5 |
| K = | −1.86029E+00 | −7.79107E+01 | −4.79706E+02 | −5.00000E+02 |
| A4 = | 1.23693E−01 | 9.41999E−01 | −2.40343E−01 | −1.03600E−02 |
| A6 = | 5.52955E−01 | −3.60909E+00 | 4.04849E−01 | −7.11842E−01 |
| A8 = | −1.85918E+00 | 1.27055E+01 | −1.23228E+00 | 6.21543E−02 |
| A10 = | 3.37155E+00 | −2.33371E+01 | 1.66319E+00 | −3.07549E−02 |
| A12 = | −2.17281E+00 | 1.87936E+01 | −9.27959E−01 | 7.80934E−03 |
| A14 = | — | — | — | −8.33706E−04 |

TABLE 7

| | Embodiment 1 | Embodiment 2 | Embodiment 3 |
|---|---|---|---|
| f | 3.86 | 3.99 | 3.86 |
| Fno | 2.85 | 2.87 | 2.85 |
| HFOV | 31.5 | 30.7 | 31.5 |
| f/EPD | 2.85 | 2.87 | 2.85 |
| f/f1 | 1.11 | 1.07 | 1.12 |
| f/f2 | −0.24 | −0.21 | −0.28 |
| R1/R2 | 0.52 | 0.59 | 0.51 |
| R3/R4 | −0.24 | −2.24 | −0.37 |
| N1 | 1.543 | 1.543 | 1.543 |
| |V1 − V2| | 0.0 | 0.0 | 30.1 |
| V2 | 60.3 | 60.3 | 30.2 |
| CT2 | 1.385 | 1.188 | 1.348 |
| T12/f | 0.24 | 0.28 | 0.25 |
| ANG22 | −70.4 | −63.7 | −69.1 |
| TL/ImgH | 1.81 | 1.82 | 1.81 |

It is noted that the tables 1-6 show different data of the different embodiments, however, the data of the different embodiments is obtained from experiments. Therefore, any product of the same structure is considered to be within the scope of the present invention even if it uses different data. Table 7 is the data relevant to the respective embodiments of the present invention.

While we have shown and described various embodiments in accordance with the present invention, it is clear to those skilled in the art that further embodiments may be made without departing from the scope of the present invention.

What is claimed is:

1. An optical lens system for taking image comprising two lens elements with refractive power and an aperture stop, from the object side to the image side:
   a first lens element with positive refractive power having a convex object-side surface and a concave image-side surface, the object-side surface and the image-side surface of the first lens element being aspheric;
   a second lens element with negative refractive power having a concave object-side surface and a concave image-side surface, the object-side surface and the image-side surface of the second lens element being aspheric, the image-side surface of the second lens element being formed with an inflection point; and
   the aperture stop located in front of the first lens element;
   wherein a focal length of the second lens element is f2, a focal length of the optical lens system is f, an entrance pupil diameter is EPD and they satisfy the relation:

$-0.55 < f/f2 < -0.05$ $f/EPD < 3.6$.

2. The optical lens system for taking image as claimed in claim 1, wherein first lens element is made of plastic material.

3. The optical lens system for taking image as claimed in claim 1 or 2, wherein second lens element is made of plastic material.

4. The optical lens system for taking image as claimed in claim 3, wherein the focal length of the first lens element is f1, the focal length of the optical lens system is f, and they satisfy the relation:

$0.8 < f/f1 < 1.5$.

5. The optical lens system for taking image as claimed in claim 4, wherein the focal length of the first lens element is f1, the focal length of the optical lens system is f, and they satisfy the relation:

$1.0 < f/f1 < 1.2$.

6. The optical lens system for taking image as claimed in claim 3, wherein the focal length of the second lens element is f2, the focal length of the optical lens system is f, and they satisfy the relation:

$-0.35 < f/f2 < -0.05$.

7. The optical lens system for taking image as claimed in claim 6, wherein the focal length of the second lens element is f2, the focal length of the optical lens system is f, and they satisfy the relation:

$-0.3 < f/f2 < -0.2$.

8. The optical lens system for taking image as claimed in claim 3, wherein a radius of curvature of the object-side surface of the first lens element is R1, and a radius of curvature of the image-side surface of the first lens element is R2, they satisfy the relation:

$0.4 < R1/R2 < 0.7$.

9. The optical lens system for taking image as claimed in claim 8, wherein a radius of curvature of the object-side surface of the second lens element is R3, and a radius of curvature of the image-side surface of the second lens element is R4, they satisfy the relation:

$-2.5<R3/R4<-0.1$.

10. The optical lens system for taking image as claimed in claim 9, wherein a radius of curvature of the object-side surface of the second lens element is R3, and a radius of curvature of the image-side surface of the second lens element is R4, they satisfy the relation:

$-0.5<R3/R4<-0.1$.

11. The optical lens system for taking image as claimed in claim 2, wherein a refractive index of the first lens element is N1, and it satisfies the relation:

$1.53<N1<1.56$.

12. The optical lens system for taking image as claimed in claim 3, wherein an Abbe number of the first lens element is V1, an Abbe number of the second lens element is V2, and they satisfy the relation:

$|V1-V2|<10$.

13. The optical lens system for taking image as claimed in claim 3, wherein the Abbe number of the second lens element is V2, and it satisfies the relation:

$V2<32$.

14. The optical lens system for taking image as claimed in claim 6, wherein a center thickness of the second lens element is CT2, and it satisfies the relation:

$CT2<1.8$ mm.

15. The optical lens system for taking image as claimed in claim 1, wherein a on-axis spacing of the first lens element and the second lens element is T12, the focal length of the optical lens system is f, and they satisfy the relation:

$0.2<T12/f<0.32$.

16. The optical lens system for taking image as claimed in claim 1, wherein a tangential angle ANG22 at a position of an effective optical diameter of an image-side surface of the second lens element satisfies the relation:

$ANG22<-50$ deg.

17. The optical lens system for taking image as claimed in claim 1, wherein an object to be photographed is imaged on an electronic photosensitive assembly, a total optical length of the optical lens system is TL, an image height of the optical lens system is lmgH, and they satisfy the relation:

$TL/ImgH<1.9$.

18. The optical lens system for taking image as claimed in claim 2, wherein first lens element is made of plastic material.

* * * * *